March 20, 1951     W. W. SINGLETON     2,545,752
RIVET
Filed Aug. 9, 1946
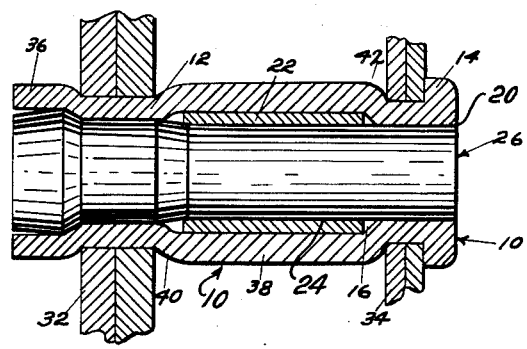
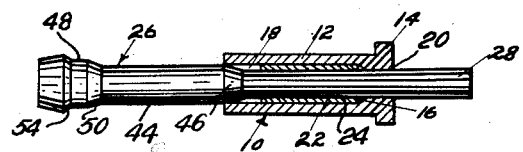
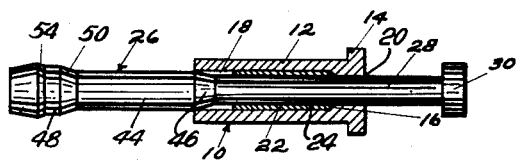
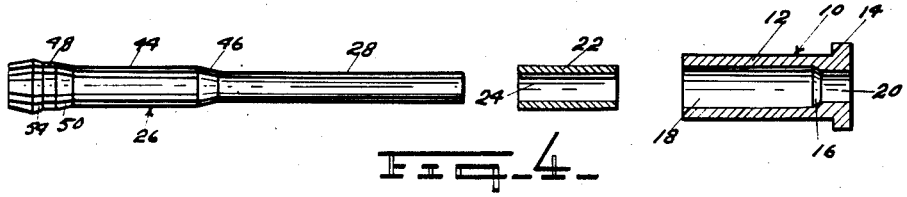
*INVENTOR.*
WILLIAM W. SINGLETON
BY
*ATTORNEY*

Patented Mar. 20, 1951

2,545,752

UNITED STATES PATENT OFFICE 2,545,752

RIVET

William W. Singleton, Detroit, Mich., assignor to Bendix Aviation Corporation, Detroit, Mich., a corporation of Delaware Application August 9, 1946, Serial No. 689,493

8 Claims. (Cl. 85—40)

This invention relates to rivets.

An object of the invention is the provision of a double grip rivet especially adapted for use on dual wall structures, and which serves as a spacer between the two wall elements.

Another object of the invention is to provide an expandable hollow rivet for double wall construction, which may be inserted through aligned openings of equal diameter in the wall elements.

A further object of the invention is to provide a double grip hollow rivet which may be set in a single pulling operation without the necessity for backing or hammering.

A still further object of the invention is to provide a double grip rivet which may be secured in place by manipulation from one side only.

Yet a still further object of the invention is the provision of a double grip hollow rivet to be expanded in place by a forming mandrel drawn into the rivet and permanently contained therein to provide additional strength and rigidity.

Other objects and advantages of the invention will appear from the following description taken in connection with the accompanying drawings forming a part of this application, and in which—

Fig. 1 is a partial section view of the assembled rivet after it has been expanded in place and the forming mandrel severed flush with the formed head.

Fig. 2 is a partial section view showing the pulling pin and sleeve in place within the hollow rivet.

Fig. 3 is a partial section view similar to Fig. 2, except that a gripping head has been formed on the pulling pin; and Fig. 4 is an exploded view of the rivet assembly showing the tension member in elevation and the sleeve and rivet body in section.

Referring to the drawings for more specific details of the invention 10 represents a rivet body having a shank 12 and an enlarged pre-formed head 14 on one end thereof. The rivet body 10 has a double diametral axial bore therethrough providing therein an annular tapered shoulder 16 adjacent the rivet head 14. The larger bore 18 is contained within the rivet shank 12 and the smaller bore 20 extends through the rivet head 14. The tapered shoulder 16 provides a seating abutment to support an expandable cylindrical sleeve 22 adapted to be fitted into the bore 18. This sleeve 22 has an axial bore 24 slightly larger in diameter than the bore 20 in the rivet head and an over all length substantially less than that of the counterbored section 18. Both the rivet body 10 and sleeve 22 are formed of a ductile material, such as an aluminum alloy, which also has the necessary strength in tension, compression and shear.

To complete the rivet assembly a compression member is provided consisting of a duplex forming mandrel 26 and a pulling pin 28. As the diameter of the pulling pin is slightly less than that of the bore in either the sleeve 22 or the rivet body 10, a complete rivet assembly, as shown in Fig. 2, may be readily provided. To prevent the component parts from becoming separated from the rivet assembly, an engagement head 30 is formed at the free end of the pulling pin 28. This head 30 also serves as a means of applying the force necessary to position the mandrel 26, as shown in Fig. 1. The mandrel 26 is formed from a light weight material, such as an aluminum alloy, having a high tensile strength to withstand the stress imposed during the pulling operation.

To improve the general properties of the various elements comprising the rivet assembly, an annodyzing treatment is applied. This forms a porous and abrasive resistant coating over the surface thereof, which, when impregnated with a rust inhibitor such as chromic acid, becomes virtually immune to corrosion.

To reduce the frictional drag, which occurs between the rivet elements when the forming mandrel 26 is drawn into position, all sliding surfaces are lubricated with stearic acid, paraffin or any other suitable anti-friction compound. This practice, together with that of annodyzing the complete rivet assembly, prevents the forming mandrel 26 from sticking and thus insures a proper seating of each rivet.

In use, the rivet assembly previously described in detail, is especially adapted for the fabrication of double walled structures or panels, as illustrated in Fig. 1. Two spaced wall members, such as 32 and 34 are provided with aligned openings adapted to receive the complete rivet assembly shown in Fig. 3. This assembly may be inserted from one side only, a feature which makes it adaptable for use where blind riveting is required.

The length of the rivet selected must always be adequate to extend beyond the inner wall member 32 and thus provide a portion of the rivet body 10, from which to form a tail enlargement 36. The thickness of the wall members 32 and 34 must also be considered in the proper selection of a rivet, as it is this feature which governs the depth of the counterbore 18. The tapered annular shoulder 16 at the bottom thereof should always fall approximately at the inner surface of the outer wall member 34, as illustrated in Fig. 1.

In this way the sleeve 22 which seats on the tapered shoulder 16 will be free to expand laterally without any end distortion. Therefore, if the over all sleeve length is slightly less than the space between the wall members 32 and 34, the entire sleeve 22 may be uniformly expanded to form a bulbous enlargement 38 on the rivet shank 12. If the sleeves are too long, however, they either tend to follow the mandrel through the rivet body or establish a sharp radius of curvature at either end of the bulbous enlargement 38. These same tendencies also become evident when the angle of taper at the bottom of the counterbore becomes either too large or too small.

In practice, the rivets should be specified according to the distance desired between the two grips, as this automatically determines the proper length of both the sleeve 22 and counterbored section 18.

The bulbous enlargement 38 provides two annular shoulders 40 and 42 adjacent the inner surfaces of either wall members 32 and 34. These shoulders 40 and 42, in cooperation with the preformed head 14 and the tulip shaped tail enlargement 36, provide a double grip spacer rivet, which is extremely strong and exceptionally easy to set.

To secure the assembled rivet, it is necessary only to apply a separating force, by suitable means, between the preformed rivet head 14 and the engagement head 30 on the mandrel. This force draws the forming mandrel 26 through the rivet assembly, expanding the sleeve 22 and rivet body 10. The mandrel has a cylindrical body portion 44 and a working shoulder 46 responsible for expanding the rivet body 10 to provide the bulbous portion 38 between the wall members 32 and 34. This working shoulder and body portion of the mandrel passes through the rivet assembly and the pulling pin 28 is subsequently severed at the juncture of the working shoulder 46 and the pin.

The body of the mandrel also has a portion of increased diameter 48 which differs only slightly from the smaller diameter 44 and which provides a working shoulder 50 to snug up the tail portion of the rivet. This is made necessary by the stretching which occurs as a result of passing such a large portion of the mandrel 26 through this portion. Without this slight increase in diameter, that portion of the rivet body 10 passing through the inner wall member 32 would not be forced into intimate contact therewith. As a result the rivet would eventually become loose and its inner grip weakened or rendered entirely ineffective.

The large diameter 48 of the mandrel also has a working shoulder 54 responsible for shaping the tail end of the rivet.

As described and illustrated, the rivet is essentially of the plug type; however, the forming mandrel may be removed if weight rather than strength is the primary consideration. To effect this removal, the mandrel may be driven back out of the tail end thereof after the rivet has been fully expanded.

The relative dimensions of the various elements comprising the rivet assembly are for the most part dictated entirely by the general requirements of the work.

There are, however, fundamental considerations of strength which cannot be disregarded in an effort to minimize the weight of the rivet assembly. These are the columnar strength of the shank 12 and the tensile strength of the pulling pin 28. The former must be adequate to resist collapse as the mandrel 26 is drawn into position while the latter must be sufficient to withstand the force applied at the pulling head 30. These considerations are fundamental to the problem of rivet design and establish the minimum cross-sections which may characterize either the rivet shank 12 or the pulling pin 28 for any given grip separation.

Although this invention was described with reference to the details of a particular modification, it must be appreciated that the principles involved are susceptible of numerous other applications which will become apparent to persons skilled in the art.

Having thus described the invention, what I desire to claim as new and secure by Letters Patent is:

1. A rivet assembly comprising a rivet body having a preformed head at one end thereof and a double diametral axial bore therethrough, an annular tapered shoulder in the axial bore at the juncture of the two diameters, an expandable cylindrical sleeve received by the bore and seated on the tapered shoulder, and a mandrel having spaced working shoulders received by the bore and the sleeve and effective to expand spaced sections of the rivet.

2. A rivet assembly comprising a rivet body having a preformed head at one end thereof and a double diametral axial bore therethrough, the smaller diameter of which occurs at the rivet head, an annular tapered shoulder in the axial bore at the juncture of the two diameters, an expandable cylindrical sleeve in the axial bore seated on the tapered shoulder, and a pulling pin in the axial bore having a pulling head thereon outside the rivet head, and a forming mandrel on the opposite end thereof.

3. A rivet assembly comprising a hollow rivet body having an integrally formed head at one end thereof and a counterbore at the opposite or tail end extending axially to an annular tapered shoulder, a cylindrical sleeve in the counterbore seated on the tapered shoulder, a pulling pin in the axial passage provided by the sleeve and hollow rivet body, a forming mandrel on the pulling pin having spaced working shoulders for cooperation with the sleeve and rivet successively, and a gripping means on the pulling pin beyond the rivet head whereby an axial force may be applied.

4. A rivet assembly comprising a hollow rivet body having an integral pre-formed head at one end thereof and a counterbore at the opposite or tail end extending axially to an annular tapered shoulder, a cylindrical sleeve in the counterbore seated on the tapered shoulder, a pulling pin in the axial passage provided by the cylindrical sleeve and hollow rivet body, a forming mandrel having spaced working shoulders, and an engagement head on the pulling pin beyond the pre-formed rivet head whereby an axial force may be applied to draw the mandrel into the assembled sleeve and rivet body.

5. A rivet assembly comprising a hollow rivet body having an integral pre-formed head at one end thereof and a counterbore at the opposite or tail end extending axially to an annular tapered shoulder, a cylindrical sleeve in the counterbore seated on the tapered shoulder, a pulling pin in the axial passage provided by the cylindrical sleeve and hollow rivet body, a forming mandrel on the pulling pin adjacent the rivet tail, said mandrel being adapted to form an enlargement on the rivet tail and provide an expanded section on the rivet body when drawn by the pulling pin, and an engagement head on the pulling pin beyond the pre-formed rivet head whereby an axial force may be applied to draw the mandrel into the assembled sleeve and rivet body.

6. A rivet assembly comprising a hollow rivet body having an integral pre-formed head at one end thereof and a counterbore at the opposite or tail end extending axially to an annular tapered shoulder, a cylindrical sleeve in the counterbore seated on the tapered shoulder, a pulling pin in the axial passage provided by the cylindrical sleeve and hollow rivet body, a forming mandrel on the pulling pin having spaced working shoulders, and an engagement head on the pulling pin beyond the pre-formed rivet head whereby an axial force may be applied to draw the mandrel into the assembled sleeve and rivet body, said mandrel being adapted to expand first the sleeve and the rivet and then the free end of the rivet.

7. A rivet assembly comprising a hollow rivet body having an integral pre-formed head at one end thereof and a counterbore at the opposite or tail end extending axially to an annular tapered shoulder, a cylindrical sleeve in the counterbore seated on the tapered shoulder, a pulling pin in the axial passage provided by the cylindrical sleeve and hollow rivet body, a forming mandrel on the pulling pin having spaced working shoulders, and an engagement head on the pulling pin beyond the pre-formed rivet head whereby an axial force may be applied to draw the mandrel into the assembled sleeve and rivet body to expand spaced sections of the rivet, said mandrel being adapted for severance at the pre-formed head after the rivet body has been completely expanded.

8. A rivet assembly comprising a hollow rivet body having an integral pre-formed head at one end thereof and a counterbore at the opposite or tail end extending axially to an annular tapered shoulder, an expandable cylindrical sleeve in the counterbore seated against the tapered shoulder, a pulling pin in the axial passage provided by the assembled sleeve and hollow rivet body, a mandrel formed coaxial and integral with the pulling pin and extending beyond the rivet tail, said mandrel having three distinct forming shoulders the smallest being adapted to provide an expanded or bulbous section intermediate the rivet ends, the largest designed to provide a tail enlargement and the intermediate diameter calculated to expand slightly the section between the first two enlargements, said expansion and enlargements to occur when the mandrel is drawn into the rivet assembly, and an engagement head on the pulling pin beyond the pre-formed rivet head whereby an axial force may be applied to draw the forming mandrel into the assembled sleeve and rivet body.

WILLIAM W. SINGLETON.

REFERENCES CITED

The following references are of record in the file of this patent:

UNITED STATES PATENTS

| Number | Name | Date |
|---|---|---|
| 2,061,629 | Huck | Nov. 24, 1936 |
| 2,195,029 | Hathorn | Mar. 26, 1940 |
| 2,248,755 | Hathorn | July 8, 1941 |
| 2,370,776 | Carlson | Mar. 6, 1945 |

FOREIGN PATENTS

| Number | Country | Date |
|---|---|---|
| 472,329 | Great Britain | Sept. 22, 1937 |
| 536,476 | Great Britain | May 15, 1941 |